H. J. STONE.
MACHINE FOR CUTTING PRINTERS' LEADS.

No. 171,248.

Patented Dec. 21, 1875.

WITNESSES.
Geo. P. Gordon
Thos. F. Stoddard

Henry J. Stone by A. Sidney Doane atty

INVENTOR.

UNITED STATES PATENT OFFICE.

HENRY J. STONE, OF NEW HAVEN, CONNECTICUT.

IMPROVEMENT IN MACHINES FOR CUTTING PRINTERS' LEADS.

Specification forming part of Letters Patent No. 171,248, dated December 21, 1875; application filed April 12, 1875.

*To all whom it may concern:*

Be it known that I, HENRY J. STONE, of New Haven, New Haven county, Connecticut, have invented, made, and applied to use Improvements in the Construction of Machines for Cutting Printers' Leads; and that the following is a full, clear, and correct description of the same, reference being had to the accompanying drawing making part of this specification, and to the letters of reference marked thereon, in which—

Figure 1:
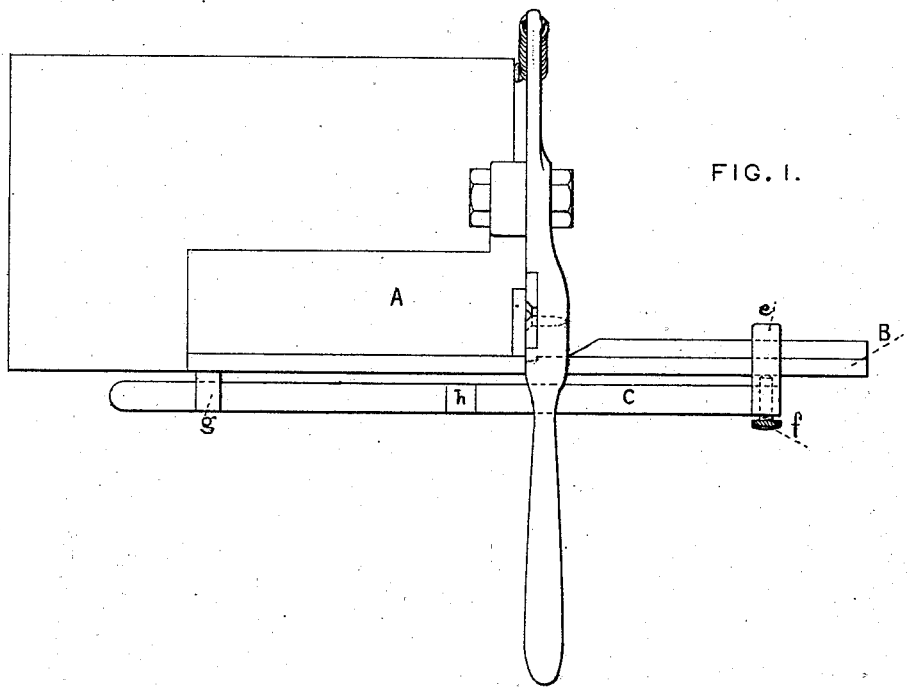
Figure 2:
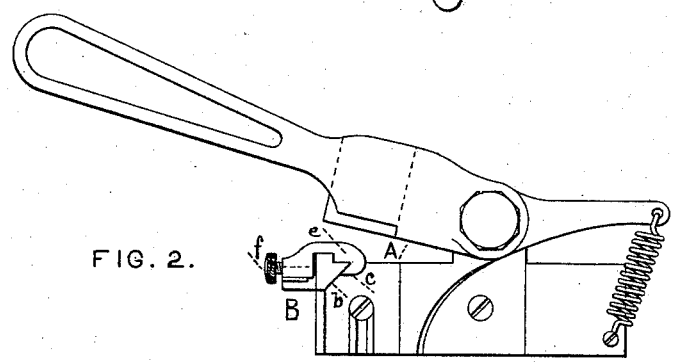
Figure 3:
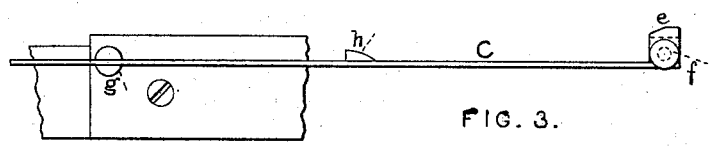

Figure 1 is a top view of a lead-cutter provided with my improvement. Fig. 2 is an end view of the same. Fig. 3 is a view of a section of the lead-cutter, and of the adjustable gage.

In the drawing, like parts of the invention are pointed out by the same letters of reference.

The nature of my invention consists in providing a machine for cutting printers' leads with an extension-rest to support the portion of the lead to be cut, and an adjustable gage so constructed that, the pattern or sample lead being placed at one end of the gage, the corresponding length of lead shall be cut at the opposite end of the gage.

To enable those skilled in the arts to make and use my invention, I will describe the construction and operation of the same.

A shows one of the lead-cutters in common use, composed of a bed-plate and movable cutting-surface. To this ordinary lead-cutter A I attach an extension-rest, B, projecting beyond the forward end of the bed-plate, and forming, as it were, a continuation of the same. This rest B has a portion of its surface cut away, as at *b*, over which the hooked forward end *c* of the gage C is passed, having a bearing upon the beveled under side of the rest B. C shows the gage employed by me, consisting of a flat strip of metal of suitable length, having secured upon its forward end a hook-piece, *c*, attached to a slotted projecting block, *e*, the hook-piece *c* being intended to pass over the rest B, and have a bearing upon the beveled under side of the same, while the slotted portion of the block *e* shall have a bearing upon the rest B. A set-screw, *f*, is passed through the forward end of the gage and through the block *e*, and holds the gage in position by its bearing upon the front side or face of the rest B. The rear end of the gage C is received within a slotted lug, *g*, secured upon the front of the bed of the lead-cutter near its rear end, and *h* is a stop secured upon the face of the gage about midway its length.

Such being the construction, the operation may be thus described: It being desired to cut any number of leads of a given length, the sample or pattern lead is laid upon the gage C, between the slotted lug *g* and the stop *h*, and the gage C is moved along until the sample lead just fills the space between the slotted lug *g* and the stop *h*, and is confined between them, the stop *h* being placed upon the gage *c* just the distance that the hooked slotted projecting block *e* is from the face of the cutting portion of the cutter. When the gage is extended to its full extent the backward movement of the gage governs or determines the space between the face of the cutter and the forward end of the gage, which space is just the length of the lead to be cut, and harmonizes with the length of the sample or pattern lead received and held between the slotted lug and the stop. The set-screw *f* is now fastened, and the gage is held in position. The handle of the cutter may now be raised, the lead to be cut placed upon the bed-plate and advanced until its forward end is stopped by the projecting block *e* of the gage C, the cutter depressed, and the lead will be cut off the desired length. During the cutting operation the forward portion of the lead is received and rests upon the extension-rest B, so that the lead is more accurately and evenly cut than were it to project beyond the lead-cutter unsupported, which is usually the case. By the employment of a gage constructed as shown, the length of the lead can be more accurately determined than usual and more rapidly.

Having now set forth my invention, what I claim as new is—

The combination, with a lead-cutter, A, of an extension-rest, B, and adjustable gage C, substantially as and for the purposes set forth.

HENRY J. STONE.

In presence of—
A. SIDNEY DOANE,
R. M. MATTESON.